Figure 1:
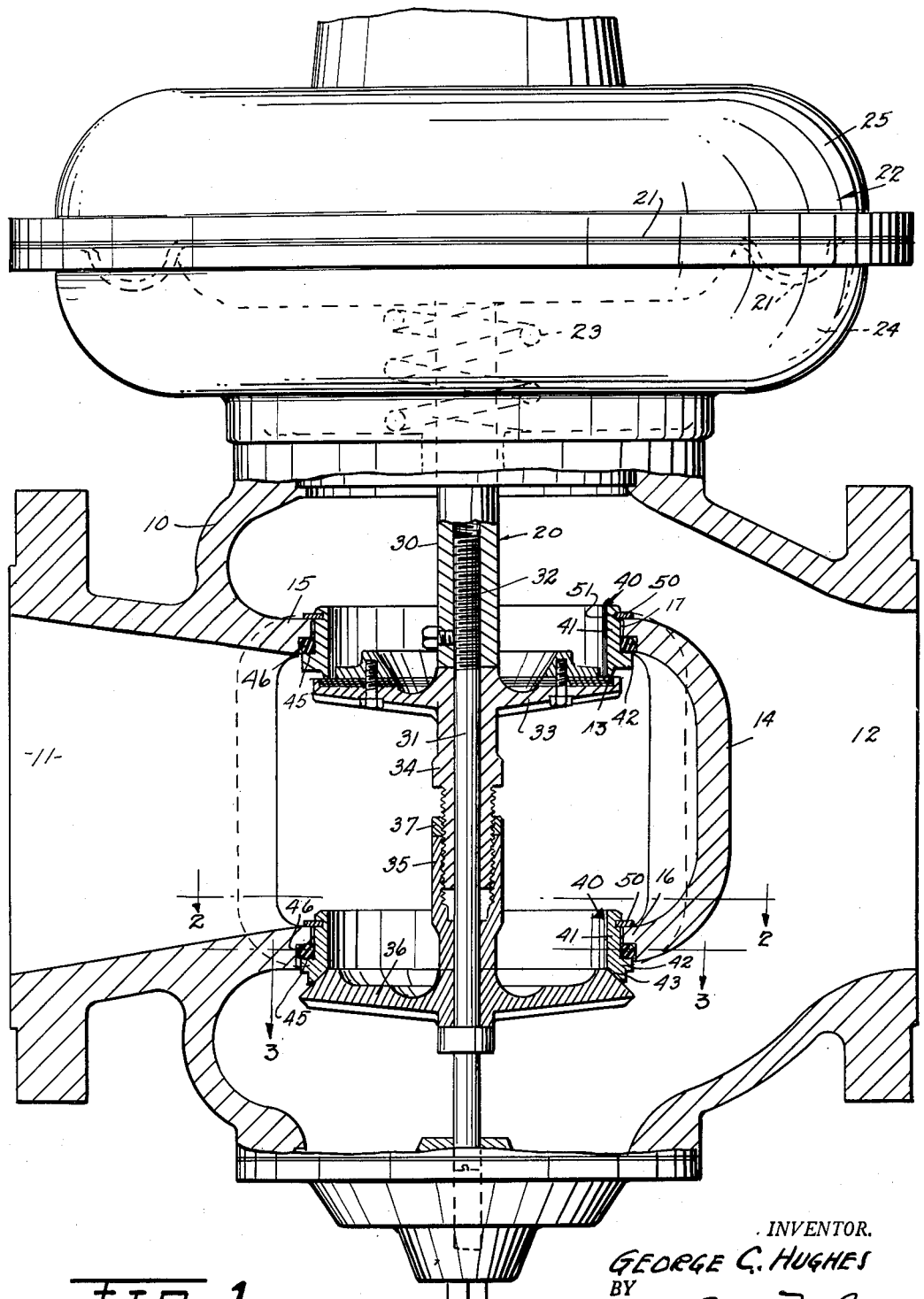

Jan. 17, 1956  G. C. HUGHES  2,731,036
VALVE SEAT STRUCTURE
Filed Oct. 6, 1951  2 Sheets-Sheet 1

INVENTOR.
GEORGE C. HUGHES
BY
Bates, Teare, & McBean
ATTORNEYS

Jan. 17, 1956　　　G. C. HUGHES　　　2,731,036
VALVE SEAT STRUCTURE
Filed Oct. 6, 1951　　　　　　　　　　　2 Sheets-Sheet 2

INVENTOR.
GEORGE C. HUGHES
BY
Bates, Teare, & McBean
ATTORNEYS

United States Patent Office 2,731,036
Patented Jan. 17, 1956

2,731,036
VALVE SEAT STRUCTURE

George C. Hughes, Anderson, Ind., assignor to Reynolds Gas Regulator Company, Anderson, Ind., a corporation of Indiana Application October 6, 1951, Serial No. 250,061

2 Claims. (Cl. 137—625.34)

This invention relates to improvements in valves and particularly to an improved valve of the type having a pair of valve port openings, the flow of fluid through each of which is controlled simultaneously by respective valve members having a common actuating member. The invention is especially concerned with improvements in valves having a pair of axially spaced valve port openings which are opened and closed simultaneously by respective coacting valve members carried by a common valve stem.

In the past great care has been required in the manufacture of valves of the type having a pair of valve port openings which are to be simultaneously opened and closed. It has been found difficult to construct such valves so that both valve members will close tightly when the valve actuating member is moved to a valve closing position. Despite the care used in the manufacture of such valves it has been found that the valves tend to seep fluid when the valve members supposedly have been moved to their closed position. This is due to minor inaccuracies in the manufacture of the various parts of the valve and to the fact that critical adjustments are required in assembling such parts. The seepage is also due to the fact that such valves are used under varying temperature conditions which cause variations in the expansion and contraction between various parts of the valve due to the use of materials of differing types and variations in shape of the various valve parts.

According to the present invention, these difficulties are overcome by providing the valve body with a pair of removable valve seat members which are mounted in the valve port openings for a limited movement in the direction of the closing movement of their associated valve members, the movement of the seats being restrained by an annular ring of resilient material, such as a rubber composition or the like. This ring is interposed between a shoulder formed on its respective valve seat member and the wall of the valve adjacent the valve port opening. The ring also serves to provide a fluid seal between the valve seat member and the valve body. Accordingly, when one valve member seats prior to the seating of the other valve member, such member together with its valve seat may move bodily as a unit until the other valve member is seated, thereby insuring the closing of both valve members and the elimination of seepage. Further, by permitting a relatively small axial movement of the valve seat member under the influence of the closing action of the valve member, minor misalignments between the seat and valve members are compensated for.

Other advantages and objects of the invention will become more apparent from the following description which refers to one embodiment of the invention illustrated in the accompanying drawings. The essential features of the invention will be summarized in the claims.

Figure 4:
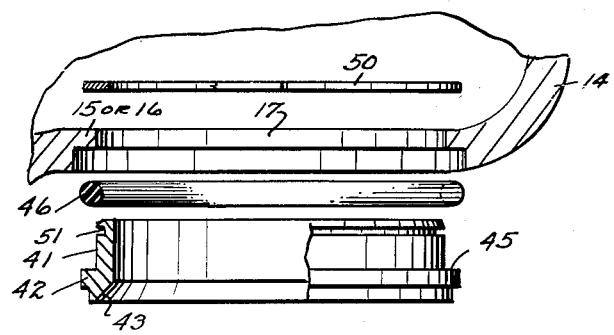
Figure 5:
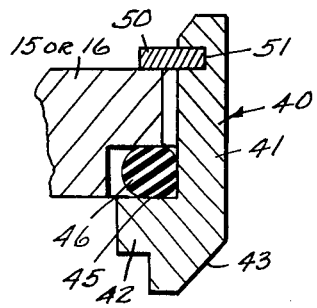
Figure 3:
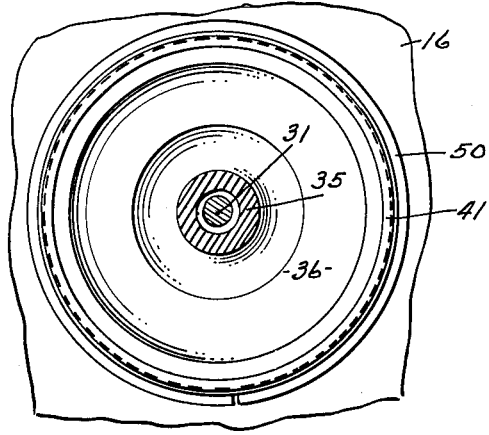
Figure 2:
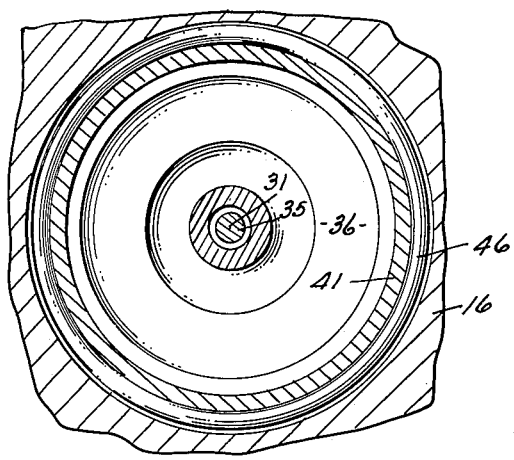

In the drawings, Fig. 1 is a fragmentary vertical section through a valve embodying the present invention; Figs. 2 and 3 are transverse sections, as indicated by the correspondingly numbered lines on Fig. 1; Fig. 4 is a diagrammatic illustration, partially in section, showing the parts of the valve seat and associated valve structure prior to assembly and Fig. 5 is an enlarged fragmentary sectional detail through the valve seat member and the associated supporting structure.

In the drawings there is shown a valve body 10 having an inlet opening 11, an outlet opening 12, together with a partition 14 separating the two openings. The partition 14 is provided with a pair of substantially parallel spaced walls 15 and 16, each of which is provided with a valve port opening 17. These openings are cylindrical and in axial alignment, one with the other. A suitable valve stem 20 extends axially through the openings 17. This stem is supported in any well known manner, as, for instance, by the usual diaphragm structure generally indicated at 21. The diaphragm structure is enclosed in supplemental housing 22 and includes the usual diaphragm 21 extending across the housing 22 and to which the valve stem 20 is secured in the usual manner. A spring 23 may be provided to move the valve in one direction, for instance, to an open position.

The valve stem may be actuated in the usual manner by fluid pressure differentials in chambers 24 and 25 formed in the casing 22 on either side of the diaphragm 21. While the valve has been illustrated as a diaphragm actuated valve, it is, of course, obvious that any means may be used to move the valve stem and cause the valve members carried thereby to open and close the valve ports.

The valve stem 20, as shown, comprises an upper part 30 which is secured to a valve-operating member such as the diaphragm 21. A valve rod 31 is axially mounted in the stem 30 as by the usual threaded connection 32. One valve member, for instance the member 33, may comprise a valve disc mounted on a rod 31 abutting the stem portion 30. This valve disc is provided with a downwardly projecting boss 34 which threadingly engages a coacting boss 35 of a second valve member 36 rotatively mounted on the rod 31. An adjusting nut 37 is provided to secure the two valve members 33 and 36 in adjusted position axially relative to each other. The construction is such that the valve stem 30 and both valve members comprise a rigid structure which moves as a unit to a closing position consequent upon an upward movement of the valve stem 20. Were the valve seats rigidly fixed to the valve body, the valve members would have to engage their seats simultaneously to prevent the flow of fluid through the valve port opening when the valve members are in their closed position. Accordingly, the adjustment of the axial distance between the two valve members is critical, as is the alignment of the two valve members with each other and with their respective valve seats.

To provide for minor inaccuracies in the alignment of the valve stem with the valve port openings, and minor discrepancies in the axial distance between the two valve members relative to the distance between their respective valve seats, the present invention provides each valve port opening 16 and 17 with a valve seat 40 which is axially movable in its respective valve seat opening. Accordingly, should one valve member strike its seat prior to the other valve member, such seat may move axially in its valve port opening until both members have been seated.

As illustrated, each valve seat member 40 comprises a cylindrical sleeve 41 of a diameter slightly smaller than the diameter of the associated valve port opening so as to permit axial movement of the valve seat member and to permit a relatively small tilting of the sleeve 41 to compensate for misalignment of the valve members. Each sleeve 41 is provided with an outwardly extending annular flange 42 and a valve seat surface 43. The flange 42 of each valve seat member provides an upwardly facing shoulder 45 which underlies the respective portion of the partition wall 15 or 16 associated therewith. Interposed between each shoulder 45 and its associated wall is an annular ring 46 of resilient compressible rubber-like material which, in its normal or unassembled condition, is circular in cross section and, as indicated in Fig. 5, has an internal diameter slightly less than the external diameter of the valve seat member. Each valve seat member is retained in place by split spring-like locking ring 50 which is removably mounted in a groove 51 formed in the external surface of the sleeve 41 and extends radially outward therefrom. The ring 50 engages the upper surface of the associated partition wall 15 or 16, and the distance between such locking ring 50 and the shoulder 45 of the valve seat member is such that, when the locking ring 50 is in position, the annular ring 46 is partially compressed so that it forms a fluid seal between the valve seat member 40 and its associated partition wall. This distance, however, is such as will permit further compression of the sealing ring 46 as its respective valve member is moved into a seated position.

From the foregoing it will be seen that the improved seat construction eliminates seepage through the closed valve members despite minor variations in manufacture, assembly, and compensates for variations in temperature.

I claim:

1. In a valve having a valve body provided with an inlet and outlet, separated by a partition wall having a pair of separated valve port openings, a valve seat associated with each port, a movable valve member coacting with each valve seat, means rigidly connecting said valve members, means to move both valve members simultaneously to and from their respective seats to control the passage of fluid through the associated valve ports wherein one of said seats comprises a sleeve slidably mounted in its respective valve port for movement in a direction substantially parallel with the direction of the closing movement of its respective valve member, said seat member having an external diameter less than the internal diameter of the associated valve port opening to permit limited movement of the valve seat in a radial direction, said seat member having a valve seat surface facing its respective valve member and an annular shoulder facing in the opposite direction and underlying the partition wall, a ring of rubber-like compressible resilient material encircling said sleeve and interposed between said shoulder and the associated partition wall to provide a fluid-tight seal therebetween, and means carried by the sleeve and coacting with said partition wall to pre-compress the ring between the shoulder and the partition wall and to limit the movement of the shoulder away from the partition while permitting movement of the shoulder toward the partition consequent upon pressure of the valve member on the valve seat surface in a closing direction.

2. A valve seat construction for a valve having a partition wall with a cylindrical valve port opening extending therethrough, said valve seat comprising a cylindrical sleeve extending through said opening and having an external diameter sufficiently less than the diameter of the cylindrical opening to permit limited radial movement in any direction of the sleeve in the port opening and extending through said opening, said sleeve having a valve engaging surface at the lower end thereof, said seat member having an outwardly extending annular flange providing a radially extending shoulder adapted to underlie the partition wall, a ring of resilient rubber-like material encircling said sleeve and having an internal diameter which in a normal condition is less than the external diameter of said sleeve, said ring being positioned between the underlying shoulder and the partition wall, said sleeve having an annular groove spaced above said flange, a split spring retaining ring mounted in said groove and extending radially outward from said sleeve and overlying the partition wall to precompress said resilient ring while permitting further compression thereof consequent upon engagement of the valve member with the bottom of said seat.

References Cited in the file of this patent

UNITED STATES PATENTS

| | | |
|---|---|---|
| 463,175 | St. John | Nov. 17, 1891 |
| 801,458 | Huxley | Oct. 10, 1905 |
| 1,493,784 | Larson | May 13, 1924 |
| 2,330,610 | Natter | Sept. 28, 1943 |

FOREIGN PATENTS

| | | |
|---|---|---|
| 432,865 | Germany | 1926 |
| 642,546 | Germany | 1937 |